United States Patent [19]

Lindblom

[11] 4,371,017
[45] Feb. 1, 1983

[54] FOREST THINNING DEVICE

[75] Inventor: Karl T. Lindblom, Alfta, Sweden

[73] Assignee: Ostbergs Fabriks AB, Alfta, Sweden

[21] Appl. No.: 191,813

[22] Filed: Sep. 26, 1980

[30] Foreign Application Priority Data

Oct. 8, 1979 [SE] Sweden ................................ 7908312

[51] Int. Cl.³ ............................................ A01G 23/08
[52] U.S. Cl. ................................................... 144/3 D
[58] Field of Search ..................... 144/2 Z, 3 D, 34 R,
144/34 E, 34 A, 509 AC; 180/89.13, 327

[56] References Cited

U.S. PATENT DOCUMENTS 3,911,980 10/1975 McColl ................................ 144/3 D
3,944,098 3/1970 Foote ................................ 180/89.13
4,340,127 7/1982 Broberg ................................ 180/327

FOREIGN PATENT DOCUMENTS 364852 3/1974 Sweden .
391861 3/1977 Sweden .
406413 2/1979 Sweden .
371924 12/1979 Sweden .
411415 12/1979 Sweden .
280090 6/1977 U.S.S.R. .............................. 144/3 D

*Primary Examiner*—W. D. Bray
*Attorney, Agent, or Firm*—Cushman, Darby & Cushman

[57] ABSTRACT

The invention relates to a forest thinning device for forest working vehicles with an operator's cabin (2) and a crane beam (13) operated from this cabin, at the end of which a felling and gripping aggregate (14) is mounted. A markedly greater reach and increased operating possibilities at forest thinning are obtained in that the operator's cabin (2) together with the crane beam (13) according to the invention is supported at its end by a boom arrangement (4) attached to the vehicle and extendable from this.

7 Claims, 2 Drawing Figures

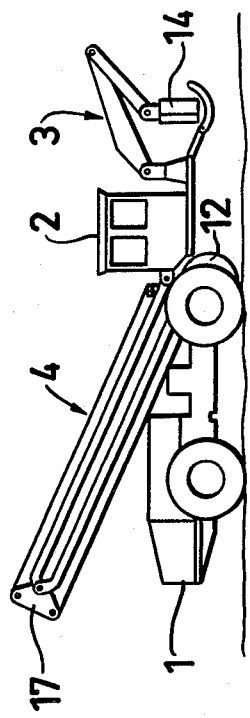
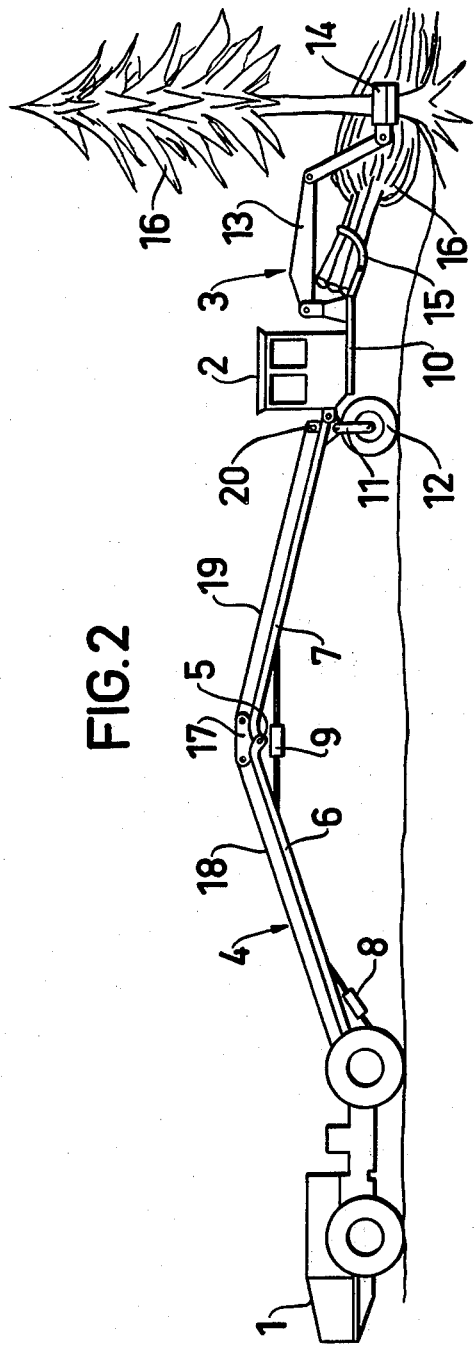
FIG.1
FIG.2

FOREST THINNING DEVICE

This invention relates to a forest thinning device for forest working vehicles with an operator's cabin and a crane beam operated from said cabin, a felling and gripping aggregate being fitted to the end of the crane beam.

Mechanization in forestry has in the last decades rationalized final felling operations radically. As this has resulted in totally clear-felled areas, it has never been necessary to consider the damage of the machines to remaining forest. The essential thing has been considered to reach a high capacity.

When it comes to thinning young forests there will be much greater problems when trying to mechanize also this work. The importance and problems are illustrated in brief in the following points.

1. I.a. due to deficiency of wood the young forest must be thinned in order that remaining trees should grow faster and give trunks of a larger volume. In addition it is necessary to utilize the thinned small trunks for energy purposes and pulp contribution.

2. Today manual thinning will be very expensive, and therefore there is a great need of mechanizing thinning.

3. I.a. for transport of wood out of the stand of trees strip roads must be cut out through the area. In order not to disturb the productive wood ground these strip roads must not be arranged too close to each other. The minimum distance should be about 30 m.

4. When trying to reach into the stand of trees by means of long crane beams in order to fell and move the wood back to the strip road the following problems have been present:

(a) Crane beams of a great length—such as over 15 m—will be of a advanced structure, expensive and heavy;

(b) When a working tool is attached to the end of such a long beam an exceptionally great lifting moment is necessary to balance and operate the extended arm with a load, from a vehicle on the strip road;

(c) A long crane beam will damage too many of the remaining trees so that these cannot provide wood of full value in the future;

(d) Due to sight obstructing twigs and a long distance the operator's sight will be impaired, which makes it impossible to choose the most suitable trees for thinning;

(e) The operator's concentration on the work which has thus become more difficult, will result in an unacceptably high stress;

(f) Inward and outward operations of a long and heavy crane beam will require long cycles for each separate tree, which cannot be accepted in view of costs, as the usual trees to be thinned have a small volume. Thus, the volume output per unit of time will be too low to be economic.

The above-mentioned problems are, according to the invention, solved or reduced in that with the forest thinning device of the invention the operator's cabin together with the crane beam is supported at the end of a boom means attached to the vehicle and extendable from this.

A preferred embodiment of the invention is described below with reference to the enclosed drawing, in which:

FIG. 1 shows a schematical lateral view of the carriage in transport position and fitted according to the invention and FIG. 2 shows a lateral view of the carriage in a thinning operation.

According to FIG. 1 the carriage consists of a base vehicle 1, an operator's cabin 2, a grapple loader 3 and a boom arrangement 4, the two last-mentioned units forming together the thinning device proper. It is the object of the base vehicle to transport the thinning device between each working set-up on a strip road, and it is provided with a motor, hydraulics, pneumatics etc. for operation of the thinning device described more in detail below.

In the embodiment shown (FIG. 2) the boom arrangement 4 consists of two booms 6 and 7 connected by means of hinge means 5. The inner end of the first boom 6 is mounted around a horizontal shaft (hidden in the figure) at the rear portion of the vehicle 1, which shaft is preferably pivotable about a vertical axis in the horizontal plane so that the whole boom arrangement 4 can be rotated in a vertical as well as a lateral direction. Hydraulic means 8 and 9 at the inner end of the boom 6 and the hinge means 5, respectively, for operation of the booms 6, 7 are only indicated symbolically.

At its outer end the second boom 7 supports on a platform 10 the operator's cabin 2 with its associated grapple loader 3, and in a holding means 11 projecting downwards a support wheel 12 which can be steered as well as driven.

In this connection it should be noted that the weight of the heavy thinning device is almost completely relieved by the existance of the support wheel 12, and therefore the base vehicle 1 can be of a relatively light type as it is not subjected to any appreciable tilting moment.

The grapple loader generally designated by 3 is disposed on the platform 10 projecting outside the cabin 2. The grapple loader is of a small, preferably conventional type with a foldable crane beam 13 laterally pivotable. At the outer end of the beam 13 a gripping and felling aggregate 14 is mounted pivotable both vertically and laterally. The platform 10 also serves as an attachment for a load support 15 projecting under the crane beam 13 for receiving felled trees 16.

In order that the operator's cabin 2 (and the platform 10) might be kept on the same level as the vehicle 1 independently of the relative positions of the booms 6, 7 the cabin (platform) is articulatedly mounted at the outer end of the boom 7 and its position controlled by parallelogram guide. This is formed by a triangular link 17 mounted around the hinge means 5, from the two upper corners of which link arms 18 and 19, respectively, extend in opposite directions, viz. the link arm 18 parallelly to the boom 6 to a (hidden) point at the rear portion of the vehicle, and the link arm 19 parallelly to the boom 7 to a point 20 in rigid connection with the operator's cabin.

All operation functions (except for the very drive of the vehicle), such as actuation of the respective hydraulic means 8 and 9 of the booms, the steering and the drive of the support wheel 12 and the operation of the crane beam 13 of the grapple loader 3, as well as the gripping and felling aggregate 14 are controlled from the operator's cabin by means of control units placed there. The associated lines for feeding from the power sources of the vehicle on one hand and the control from the operator's cabin on the other hand, as well as the operating means for crane beam and gripping and felling aggregate have been omitted in order not to complicate the figures unnecessarily.

The equipment described above is operated in the following way: When the operator with the means on the vehicle 1 in transport position according to FIG. 1 has reached a site on the strip road, he unfolds the booms 6 and 7 so that the support wheel 12 contacts the ground and can be steered to give the booms the desired direction. Preferably, the operator starts the working cycle by successively felling selected trees to be thinned in a route (corresponding to roughly the width of the operator's cabin) beginning from the strip road. In doing this, the operator straightens the hinge means of the booms by the aid of the hydraulic means 8 and 9, optionally supported by driving the support wheel 12, in order to move himself and the thinning equipment outwards towards the intended tree 16 to be thinned. The crane beam 13 is operated and the tree is felled forwards by means of the aggregate 14 and, for the time being, left on the ground. The working procedure is repeated under continued straightening of the hinge means 5, until the booms 6 and 7 will be completely extended. This final position is shown in FIG. 2; the total reach (booms plus crane beam) from the strip road can for example amount to approximately 20 m.

Now the operator transports himself and the thinning equipment backwards towards the strip road under successive felling of trees to be thinned on both sides of the route. These trees are brought directly after felling with their root end into the load support 15. The trees previously left lying on the ground are now placed there too. In the load support quite a bundle has been collected at the operator's return to the strip road. When the operator has made a "route" in the stand of trees in this way and deposited one or more bundles of thinned trees at the edge of the strip road, he returns the thinning device to the transport position shown in FIG. 1 and moves the carriage along the strip road to one route width (about 6–10 m), after which he repeats the working cycle described above at the new site.

It is apparent from the above that the following advantages over the conventional long crane beam are primarily achieved by means of the thinning device according to the invention.

1. The base vehicle need not have an extremely big stability moment;
2. A greater reach is obtained;
3. The operator is always close to the working object and can therefore choose trees to be thinned which suit well, and in addition he will not be stressed by the extremely high concentration required by the current "remote control";
4. The operator can avoid damage to remaining wood better with the small grapple loader than with a long crane beam;
5. The operator can work rapidly with the small grapple loader and fill the load support with a great number of trees before he must return for unloading at the strip road, which means a considerably improved capacity in comparison with the current long crane beam.

The invention is not restricted to the embodiment described above, but several different modifications are possible within the scope of the invention. Thus, the support wheel at the end of the boom might be replaced by a bogie, a wheel band or—in case the driving possibilities are renounced—by sliding means, such a sleigh or the like, perhaps especially as a supplement in case of snow. If the advantages according to points 3–5 above are considered to be sufficient, the ground support might in principle be dispensed with. The automatic parallelogram control of the operator's cabin with equipment might be replaced by another automatic means or manually activated levelling. Otherwise no special levelling will be required if the boom arrangement is of a telescope type instead of the foldable type shown. A specially favourable alternative of the load support described for collection of the felled trees is offered by the use of a transport wire system, known in principle per se. In this case the endless continuous driveable wire is supported by turning pulleys in both ends of the boom means (and intermediate holding pulleys). One or more gripping brackets are attached to the wire, which are brought to close and open themselves by means of control means in connection with the outer and inner boom end before passing their associated turning pulley. Thus, an open gripping bracket is swung down around the outer turning pulley for catching and then—as a consequence of closing by the control means—gripping the felled tree to be thinned held in a suitable position and towing this to the strip road. The control means of the inner boom end will now start to operate to open the gripping brackets so that the tree is deposited, after which the gripping bracket is moved back by the return portion of the wire to fetch a following tree. It is realized that much time and work can be saved by this running transport of trees in comparison with the load support arrangement. A bigger bracket is also possible with a capacity to grip a whole bundle of trees brought together by means of the crane. The bundle is transported to the strip road, while the driver is still felling trees to be thinned and placing these in a new bundle.

I claim:

1. A forest thinning device for forest working vehicles comprising a base vehicle, an operator's cabin, a crane having an arm pivotable at one end vertically and laterally, a felling and gripping aggregate pivotably carried by the other end of said arm, said arm and said aggregate being operable from the cabin by control units therein, an extendable and vertically movable boom arrangement, one end of which is mounted on the vehicle for rotation around a vertical axis, and the other end of which carries both said cabin and said crane, the boom arrangement also being retractable and extendable from the cabin by control units therein to enable movement of said cabin and crane from a retracted resting position on the vehicle, used during the transport of the same, to an extended position spaced from the vehicle.

2. A device as in claim 1, wherein a weight-relieving ground support permitting easy travel of cabin and crane over the ground is mounted below said other end of the boom arrangement.

3. A device as in claim 2, wherein the ground support is of a rolling type and includes driving and steering means operable from the cabin by control units located therein.

4. A device as in claim 1, wherein the boom arrangement is formed by two booms joined by hinge means.

5. A device as in claim 4, including a link connected to the hinge means, a first link arm extending parallel to one of the booms and connected to said link and to said vehicle, and a second link arm extending parallel to the other boom and connected to said link and to said operator's cabin forming a parallelogram control means permitting levelling of operator's cabin and crane.

6. A device as in claim 1, wherein a load support extending below the crane arm is mounted at the lower portion of the operator's cabin for receiving felled trees.

7. Forest thinning apparatus comprising a powered transport vehicle, a vertically movable boom assembly having one end mounted on the vehicle for rotation about a vertical axis, said boom having a longitudinal axis and being extendable and retractable relative to said vehicle along said axis; a crane and means supporting said crane from the other end of said boom assembly, said crane having an arm which is pivoted at one end for vertical and lateral movement; a felling and gripping assembly pivotably carried by the other end of said arm; a steerable, driven, ground-engaging support wheel carried by said other end of said boom assembly; and an operator's cabin carried by said other end of said boom assembly, said vehicle, said support wheel, said felling and gripping assembly being operable from said cabin by control units located therein, and said boom assembly being operable from said cabin by control units located therein to enable movement of said cabin, said crane, said felling and gripping assembly and said support wheel between a retracted transport position on said vehicle and an extended position adjacent selected trees to be removed.

* * * * *